Jan. 23, 1945. J. P. LANNEN 2,367,787
BALANCE TESTING MACHINE
Filed May 6, 1941 2 Sheets-Sheet 1

Inventor
Joseph P. Lannen

Patented Jan. 23, 1945

2,367,787

UNITED STATES PATENT OFFICE 2,367,787

BALANCE TESTING MACHINE

Joseph P. Lannen, Detroit, Mich.

Application May 6, 1941, Serial No. 392,045

6 Claims. (Cl. 144—288)

This invention relates to tire balancing machines and particularly to work carriers for such machines.

In testing the balance of tires, it is initially necessary to accurately center each tire at the vertical axis of a universally pivoted carrier. Unmounted pneumatic tires usually vary quite materially from a true circular form, and it is necessary in centering such tires, to shape them to exact circular form. This may be done by equipping the carrier of a balancing machine with a set of arcuate shoes jointly expansible to firmly engage the tire beads. It has been found that a tire resting on a balancing machine carrier offers considerable frictional resistance to the desired expansion, this resistance being especially strong for large and heavy tires.

An object of the invention is to provide a carrier for tire balancing machines eliminating undue friction resistance to tire expansion.

More specifically it is an object of the invention to equip a balancing machine tire carrier with a plurality of circumferentially spaced anti-friction tire seats.

Another object is to provide improved tire clamping shoes affording a tire considerably more support at the beads than prior shoes and hence tending to reduce sagging of the main body of the tire.

These and various other objects of the invention are attained by the construction hereinafter described and illustrated in the accompanying drawings, wherein.

Figure 1:
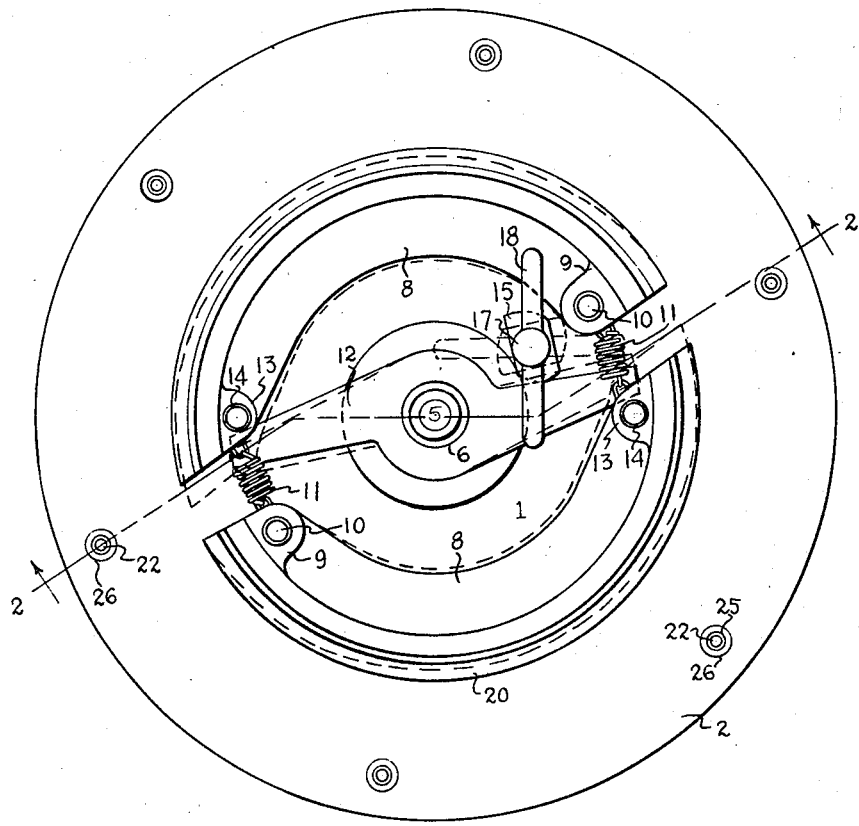
Fig. 1 is a top plan view of the improved work carrier, showing its clamping shoes expanded in full lines and retracted in dash lines.

In these views, the reference character 1 designates a circular carrier plate, disposed substantially horizontally, and having its outer portion 2 slightly offset downwardly. Upwardly extending through an opening centrally formed in said plate, is a supporting post 3, and a universal pivot for the plate is formed by a ball 4, preferably of hard steel, surmounting said post. Preferably said ball is press-fitted within the socket-forming lower portion of a plug 5, threaded or otherwise fixed within a hub 6 centrally attached by screws 7 to the plate 1 and upstanding therefrom.

A pair of substantially semi-circular tire-clamping shoes 8 are disposed in complementary relation on the plate 1, to swing to and from its axis. Thus said shoes are formed at relatively reversed ends thereof with inwardly projecting lugs 9, which engage pivot pins 10 rigidly upstanding from the plate. The free end of each shoe is connected to and urged toward the pivoted end of the companion shoe by a coiled spring 11, whereby the shoes are normally retracted to the dash line positions, shown in Fig. 1. Centrally journaled on the hub 6 and seated on a shoulder thereof, is a double-armed lever 12 for expanding the shoes, the latter having inwardly projecting lugs 13 on their free ends, in which pins 14 are vertically mounted for engagement by the lever extremities. Preferably the lugs 13 have horizontal slots in which said extremities travel to engage and disengage the pins 14. For actuating the lever, an edge thereof is engaged by a cam 15 adapted to rock on a pin 16 rigidly upstanding from the plate 1. An actuating shank 17 for the cam extends upwardly from its center, the lower portion of said shank having a socket to accommodate the pin, and a handle 18 being attached to the upper end of the shank.

It is desirable to maintain the cross-sectional form of a tire as nearly uniform as possible throughout the tire circumference, during a test of balace, and to attain this result the invention provides supports on the shoes 8 for both the upper and lower beads of a tire, spacing said supports vertically so that they tend to resist collapse or sagging of the tire. Accurate uniformity in position of the beads tends of course to promote uniformity of shape and location of the tire body throughout its circumference. To support the lower bead, each shoe has at its lower edge an exterior flange 19, seating the shoe on the plate 1, and the upper portion of each shoe is exteriorly formed with a rib 20, serving as a seat for the upper bead, said ribs being sufficiently below the top edges of the shoe to assure an adequate surface of the shoes to engage the vertical face of said bead. Said flanges and ribs are prefereably coextensive circumferentially with the shoes.

Figure 2:
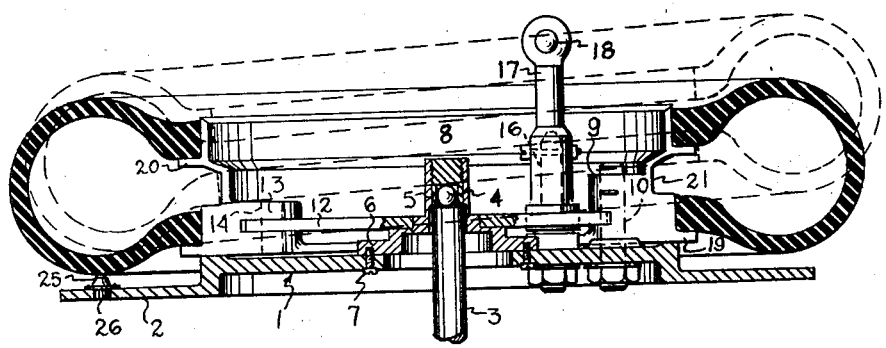
Fig. 2 is an axial vertical sectional view of the carrier and its pivotal support, taken on the line 2—2 of Fig. 1.

Described seating arrangement for the tire beads creates the problem of avoiding interference by the ribs 20 with descent of the lower tire bead to its seat on the flanges 19, and this problem is solved by inwardly channeling the shoes, as indicated at 21, between said ribs and flanges. It is to be noted, in this connection that retraction of the shoes affords a maximum clearance at their mid portions for applying a tire, and the minimum clearance at the shoe extremities. Hence the problem resolves itself into adapting the lower bead of the tire to clear the ribs 20 at the end portions of the shoes. The dash line showing of the tire in Fig. 2 indicates how the channel 21 solves the problem. Initially the lower bead is engaged in said channel at adjoined ends of the shoes, this engagement being maintained as the tire is swung down over the other ends of the shoes. The resulting momentary eccentricity of the tire to the shoes affords slight but adequate clearance between the lower bead and ribs 20 at the shoe ends over which the tire is last engaged. Both beads are readily engaged with their intended seats after the lower bead has cleared the ribs 20.

Expansion of the shoes to clamp them firmly against a tire and establish a true circular form of the latter is effected by rotating the cam 15 by means of handle 18 from its dash line position to its full line position, as shown in Fig. 1. The lever 12 is thus rocked to properly expand the shoes by pressure applied to the pins 14, and the effective transverse relation of the cam to the lever permits release of the handle 18, after expansion of the shoes, while maintaining such expansion.

If the tires are supported between their inner and outer peripheries, as well as at the beads, during expansion of the shoes and also during subsequent testing operations, this further promotes uniformity of cross-sectional form throughout circumferential extent of tires, and hence adds to accuracy of tests for balance. The portion 2 of the carrier plate is accordingly adapted to afford more or less support to the tires, and may take considerable load in testing the more flexible types of tires. It has been found that the portion 2 offers material frictional resistance to tire expansion, thereby tending to detract from uniformity of cross-sectional form of the tire throughout its circumference, since the resistance is not circumferentially uniform. This difficulty is overcome by mounting on the portion 2 a set of anti-friction seating elements suitably circumferentially spaced. Preferably said elements each comprises a metal ball 22, seating on a considerable number of much smaller metal balls 23 carried by a downwardly dished support 24. The latter is confined within a tubular holder 25, from which the ball 22 projects upwardly, said holder having its top portion sufficiently constricted to prevent escape of said ball. The lower portion of the holder is set into a suitable opening in the portion 2 and a collar 26 exteriorly secured to the holder is riveted or otherwise fastened to the portion 2.

The described anti-friction devices serve to hold the tire clear of the portion 2, and are suited to tires having considerable variation in size, owing to the raised location of the balls 22 above said portion. Since expansive movement of the tire is not truly radial at all points, adaptability of the balls 22 to universal rotation is highly desirable.

The improvements described materially add to the accuracy attained in operation of a tire balancing machine.

Figure 3:
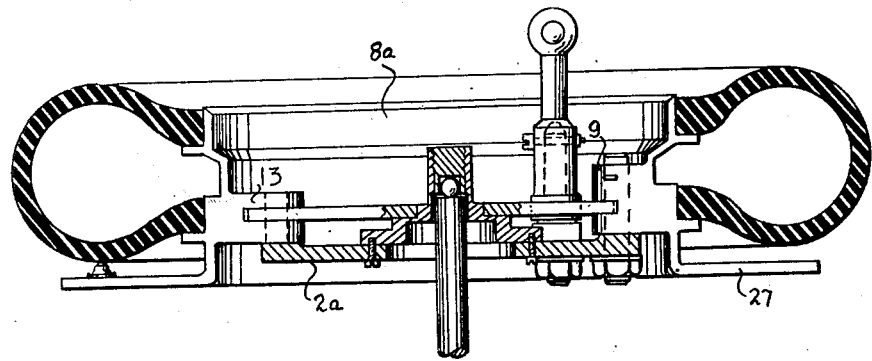
Fig. 3 is a view similar to Fig. 2 but showing an alternative mounting for the anti-friction tire-seating devices.
Figure 4:
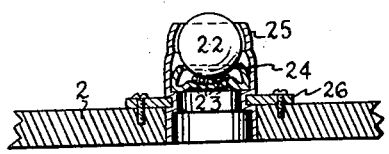
Fig. 4 is a detail view of one of the anti-friction devices, shown in axial section.

The modified construction shown in Fig. 3 accords with the preceding description, except that there is employed a smaller carrier plate 2a, inwardly spaced from the shoes 8a but having supporting engagement with the lugs 9 and 13. Anti-friction devices, as first described, are adapted to underlie and support the main body of a tire, but are carried by the shoes, the latter being integrally formed with outwardly extending plates 27 to mount said devices. The latter hold the tire uniformly spaced above the plates 27, while minimizing friction between the tire and plates, as the shoes are expanded to clamp the tire and shape it to true circular form.

What I claim is:

1. A tire-clamping shoe for a balance testing machine, said shoe having a substantially arcuate face for engagement by the beads of a tire, and having spaced projections from said surface for respectively seating the respective beads, one of said projections being set back from an edge of the arcuate face to adapt it to engage the interior face of the corresponding tire bead.

2. A tire-clamping shoe for a balance testing machine, said shoe having a substantially arcuate face for engagement by the beads of a tire, and having spaced seats for the tire beads projecting from said face and substantially coextensive, arcuately, with the shoe, one of said seats being set back from an edge of the arcuate face to adapt it to engage the interior face of the corresponding tire bead.

3. A tire-clamping shoe for a balance testing machine as set forth in claim 1, said arcuate face being formed between said projections with a channel elongated lengthwise of the shoe.

4. A tire-clamping shoe for a balance testing machine, arcuate elongated and having an arcuate face for engagement by the beads of a tire, said shoe having a flange projecting at one edge of said arcuate face to seat one bead of a tire, and a rib projecting from said face in spaced relation to its opposite edge to seat the interior face of the other bead.

5. A tire-clamping shoe for a balance testing machine, having a provision for maintaining a predetermined spaced relation between the beads of a tire engaged by the shoe, throughout the circumferential extent of said beads.

6. In a tire carrier for balance testing machines, the combination with a plurality of co-acting, substantially arcuate tire-clamping shoes, of means for actuating said shoes in unison to and from a substantially vertical common axis, said shoes having lower projections from their arcuate faces for seating engagement with the outer face of the lower bead of a tire, and having upper projections from their arcuate faces for seating engagement with the inner face of the upper bead of a tire, said arcuate faces being channeled between the upper and lower projections to facilitate passing the lower bead over the upper projections.

JOSEPH P. LANNEN.